T. VON ZWEIGBERGK.
ELECTRIC CHANGE SPEED GEARING.
APPLICATION FILED DEC. 13, 1916.

1,369,148.

Patented Feb. 22, 1921.
5 SHEETS—SHEET 1.

INVENTOR
Thorsten von Zweigbergk,
BY Albert H. Bates,
ATT'Y

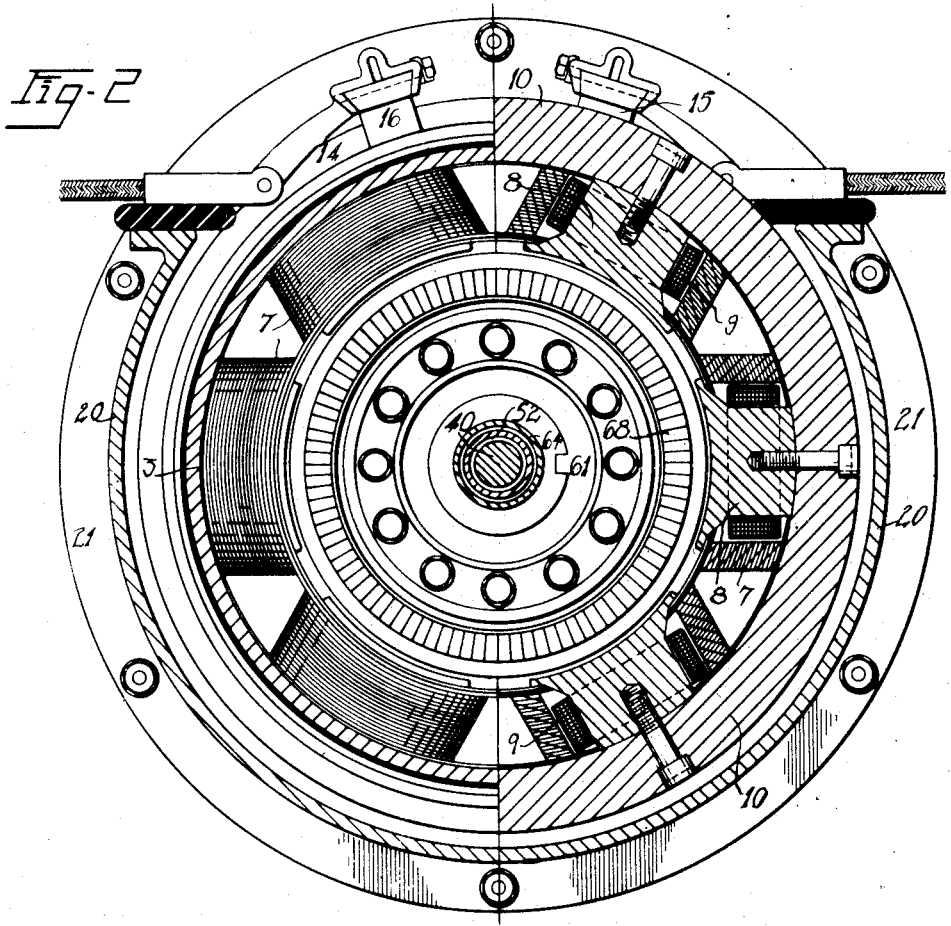
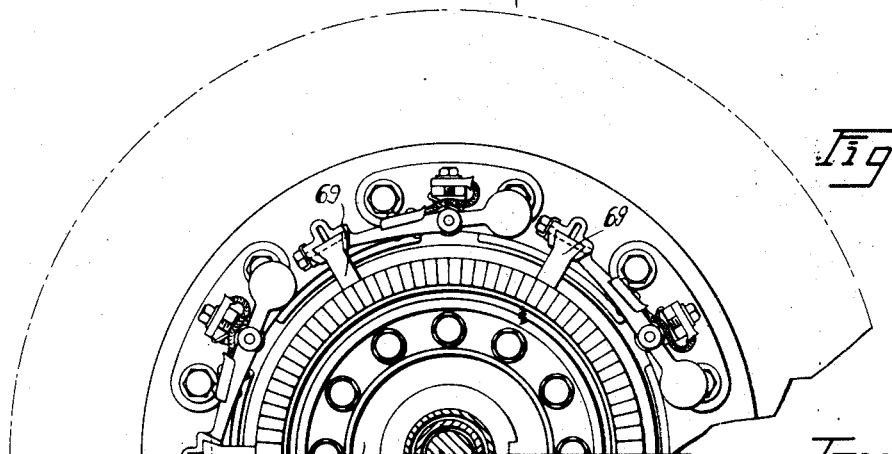

T. VON ZWEIGBERGK.
ELECTRIC CHANGE SPEED GEARING.
APPLICATION FILED DEC. 13, 1916.

Inventor
Thorsten von Zweigbergk
By Albert H. Bates
Atty.

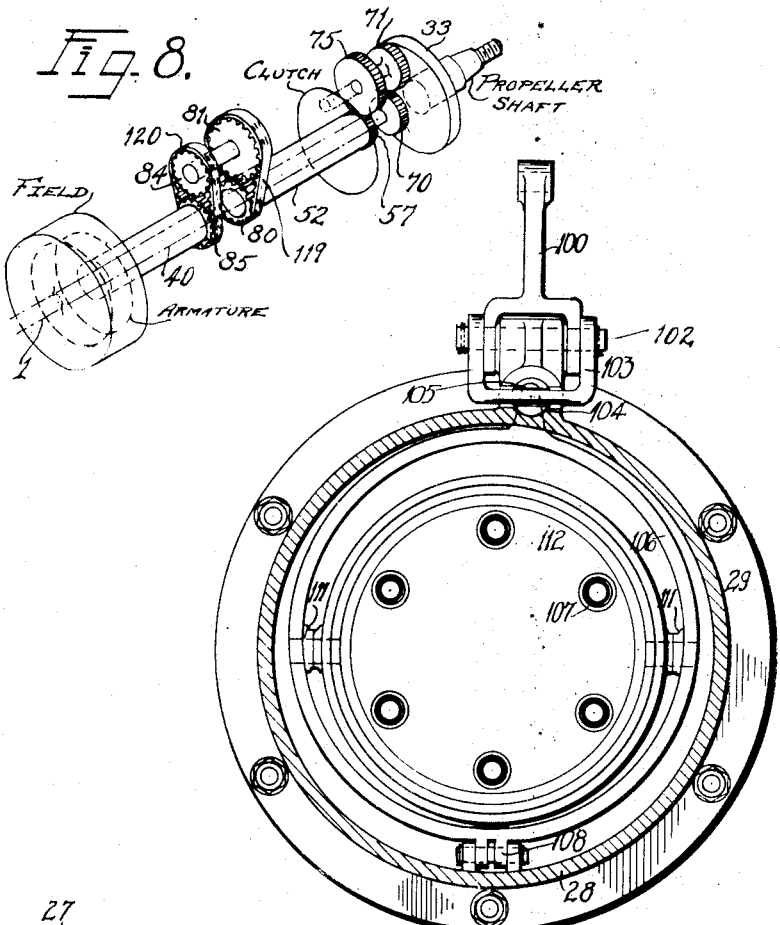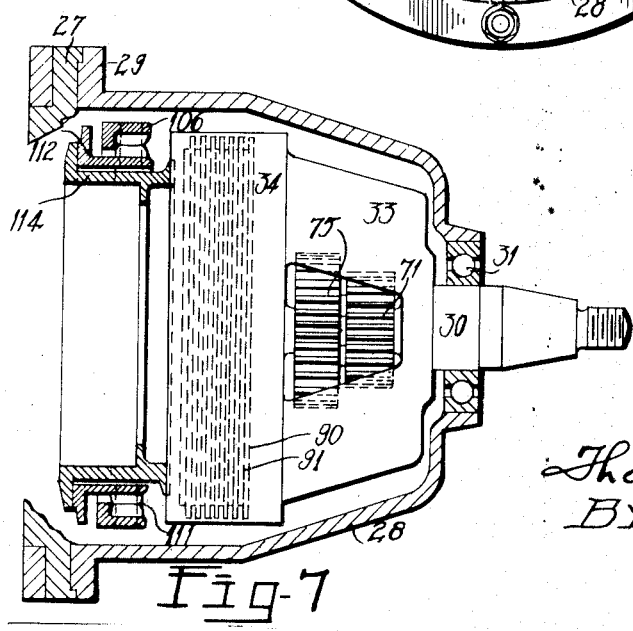

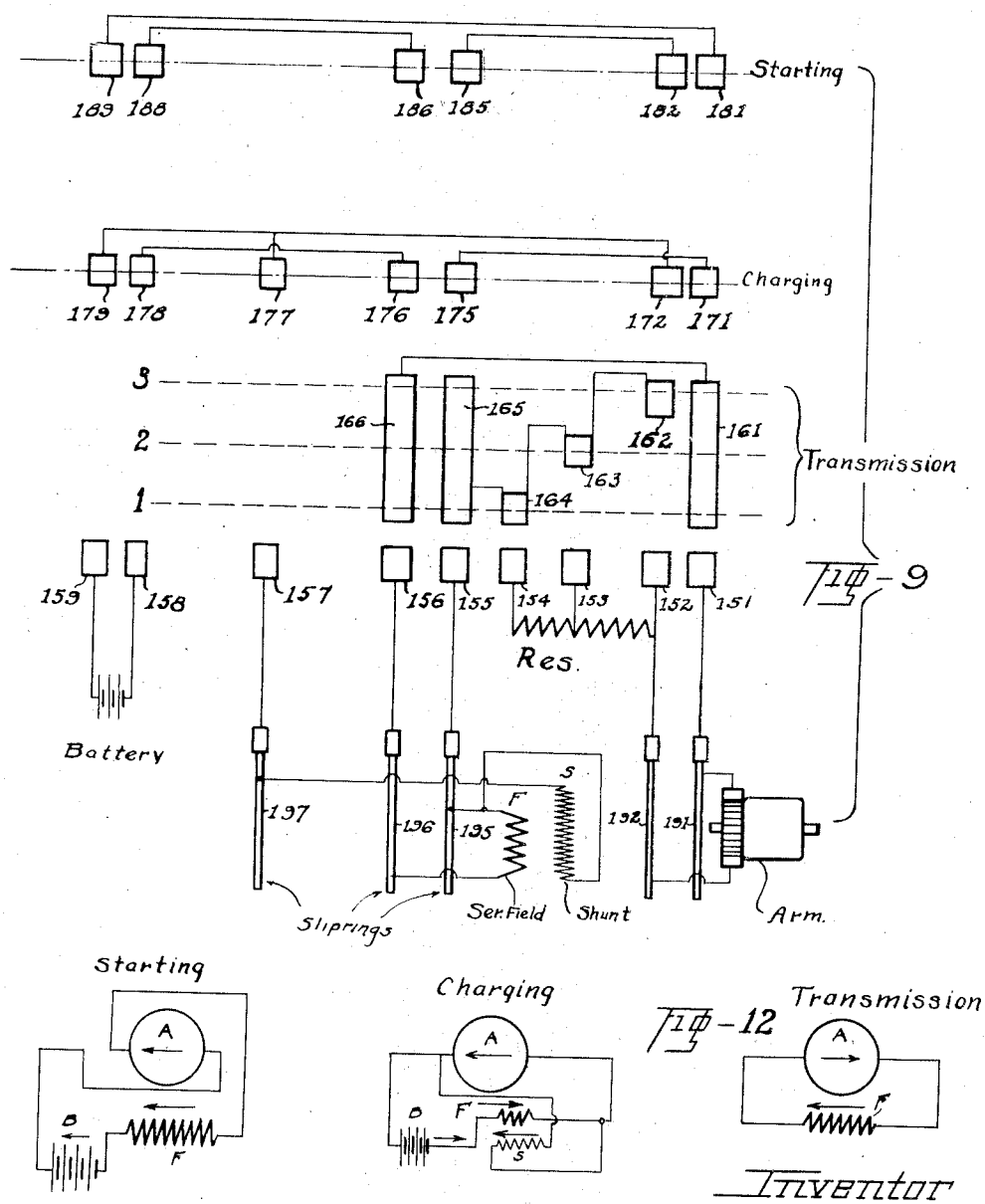

UNITED STATES PATENT OFFICE.

THORSTEN von ZWEIGBERGK, OF LANCASTER, ENGLAND.

ELECTRIC CHANGE-SPEED GEARING.

1,369,148.  Specification of Letters Patent.  Patented Feb. 22, 1921.

Application filed December 13, 1916. Serial No. 136,655.

*To all whom it may concern:*

Be it known that I, THORSTEN VON ZWEIGBERGK, a citizen of the United States, residing at Lancaster, in the county of Lancaster, England, have invented a certain new and useful Improvement in Electric Change-Speed Gearing, of which the following is a full, clear, and exact description, reference being had to the accompanying drawings.

The object of this invention is to provide an electric change speed gearing, which, while being efficient in effecting the speed transitions desired, may be small, compact and of a cheap construction. My change speed gearing is well adapted for use on an automobile, forming the unit to couple an internal combustion engine with the propeller shaft. Besides providing for the speed changes, my invention generates current which may be used for supplying a storage battery, starting, lighting, etc.

Heretofore electric speed gears have usually consisted of two electric machines, one acting as a generator and the other as a motor, the slip of the generator producing current to drive the motor, which may thus add torque to the engine at low speeds. My invention simplifies and cheapens the construction by using only one electric machine, which is so combined with other mechanism that it will give the necessary generator action as well as the motor action.

My invention is hereinafter more fully explained in connection with the drawings, and the essential characteristics are summarized in the claims.

Figure 1:
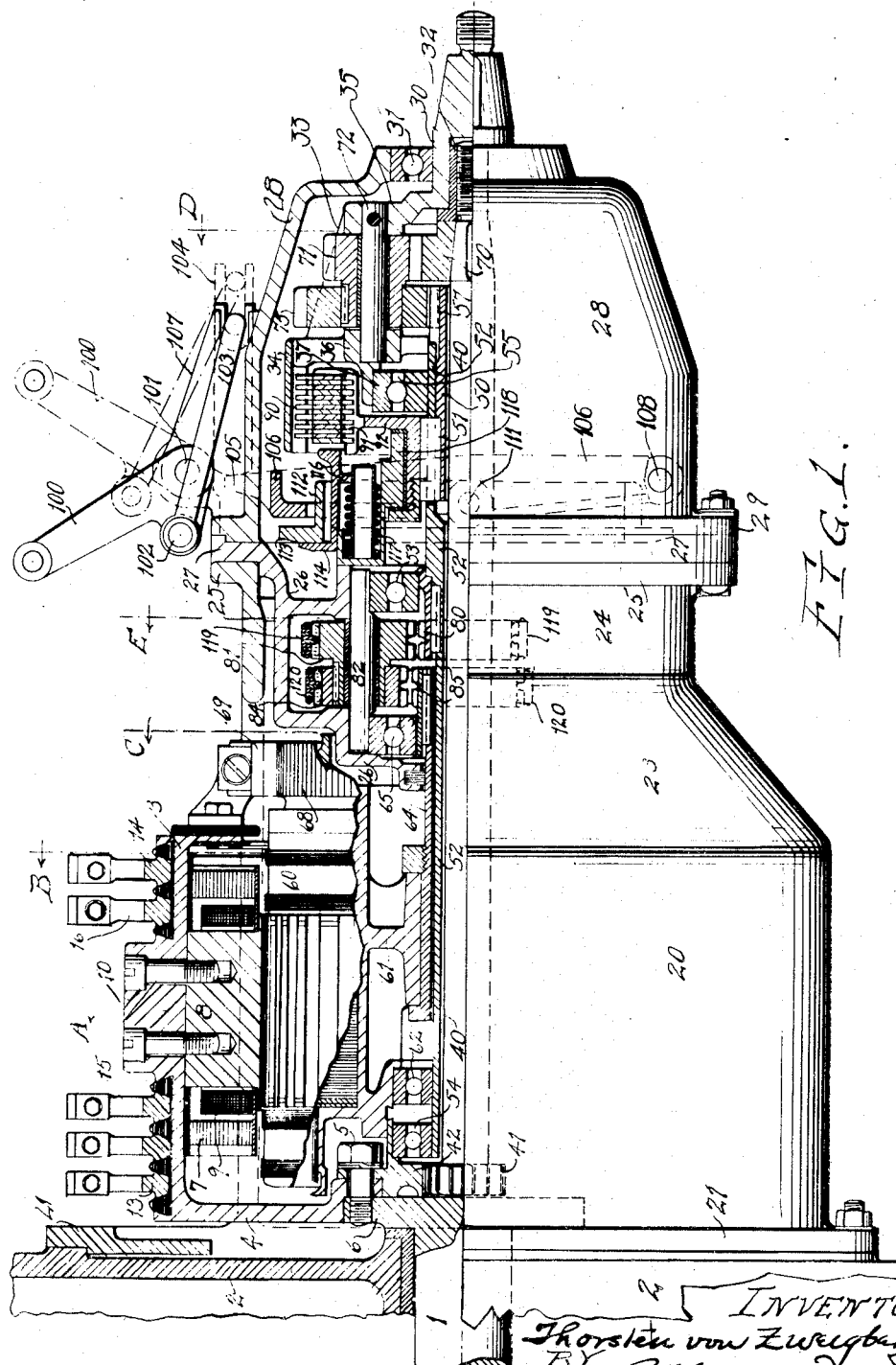
Figure 4:
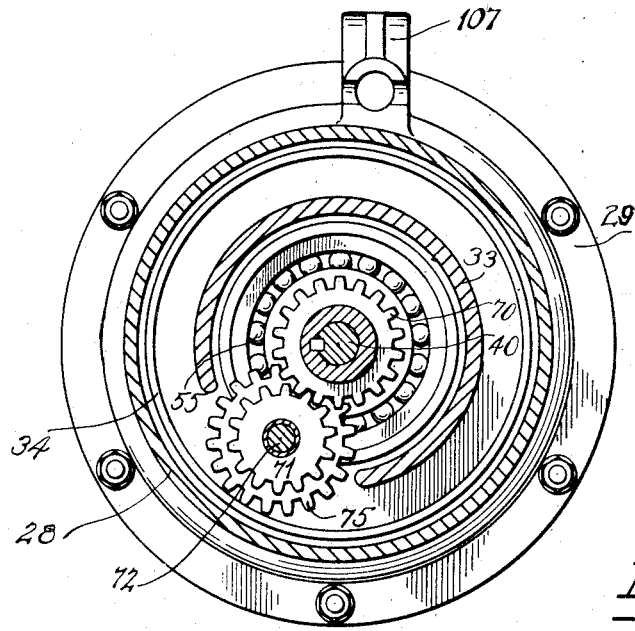
Figure 5:
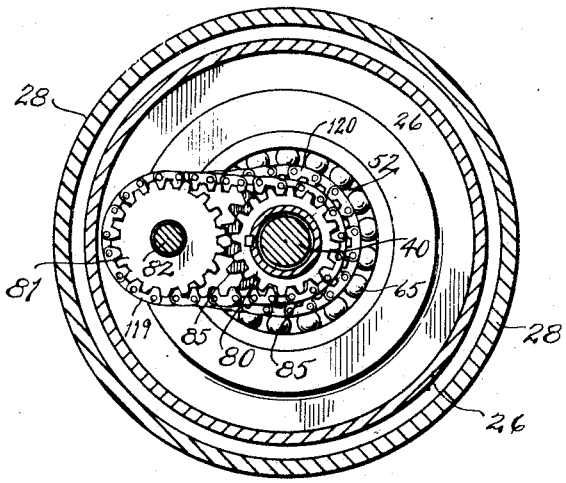

In the drawings, Figure 1 is a sectional side elevation of an embodiment of my invention; Fig. 2 is a cross section, the right hand half being on the plane indicated by the line A in Fig. 1, and the left hand half on a plane indicated by the line B, each protion of the figure showing the commutator in end elevation; Fig. 3 is a transverse section substantially as indicated by the line C in Fig. 1, and showing the commutator and its brushes in elevation; Fig. 4 is a cross section substantially on the plane indicated by the line D in Fig. 1, showing the planetary gearing in elevation; Fig. 5 is a cross section on a plane indicated by the line E in Fig. 1; Fig. 6 is a cross section, with a number of parts omitted for clearness, illustrating the clutch-shifting device. The above cross sections are all looking toward the left. Fig. 7 is a sectional plan of the clutch mechanism and the adjacent planetary gearing; Fig. 8 is a diagrammatic perspective illustrating the arrangement of essential operating parts of the invention; Fig. 9 is a diagram showing the connections whereby my invention may be used for transmission, charging and starting; and Figs. 10, 11 and 12 are diagrams showing the circuit conditions during these several operations.

Referring to the drawings, 1 indicates the shaft of an internal combustion engine, not specifically shown. The wall 2 which carries the bearing for this shaft may, if desired, be a portion of this internal combustion engine. 10 indicates a rotating field structure which is rigidly connected with the engine shaft so as to invariably rotate as the unit therewith. The frame portion of this field structure has an approximately cylindrical portion 3 from one end of which extends radially inwardly a disk-like portion 4 which is secured (as by bolts 5) to a head 6 on the engine shaft. The field frame 3 carries pole pieces 8 which are surrounded by shunt windings 9 which are shown as surrounded by edgewound series coils 7. The windings terminate in collector rings 13 and 14. Suitable brushes 15 and 16 engage these collector rings.

The stationary frame for my mechanism consists principally of a suitable inclosing casing. As shown there is a portion 20 surrounding the field structure and having a flange 21 which is bolted to the engine casing or wall 2; a converging portion 23, which may be an integral continuation of the cylindrical portion 20 and a smaller partly cylindrical portion 24 which has an outward flange 25. 26 indicates a stationary internal frame or housing, the purpose of which will be hereinafter described, and which has an outwardly extending flange 27 lying against the flange 25. The casing is completed by a member 28 which is of a sort of bell-shape and has a flange 29 secured by bolts to the flanges 27 and 25.

Journaled in the end wall of the casing member 28 is the driven shaft of my change speed mechanism designated 30, which shaft is adapted to be connected as desired with the propeller shaft of the vehicle. It is shown as mounted in ball bearings 31 carried by the casing 28, and continues inwardly in the form of a bell-shaped quill 33 (Figs. 1 and 7) hereinafter explained.

Journaled in a bearing 32 within the driven shaft 30 is the end of the main driving shaft 40, the other end of which is directly connected with the engine shaft. As shown the shaft 40 has a dental head 41 engaging a correspondingly notched recess in a collar 42 bolted to the head 6 of the engine shaft. Accordingly the shaft 40, like the field structure, revolves as a unit with the engine shaft.

Loosely surrounding the shaft 40 is a sleeve 50 which is connected by a key 51 with a sleeve 52 which is supported in ball bearings 53 and 54, the former carried by the stationary internal housing 26 and the latter by the collar 42. A ball bearing 55 is also provided between the sleeve 52 and an interior flange 37 of the quill 33. The armature is designated 60. It is mounted within the field frame on a suitable core 61 which is journaled at one end on a ball bearing 62 on the sleeve 52. The core carries also an an extension of sleeve 64 which is journaled on a ball bearing 65 on the internal housing 26.

The armature is provided with a suitable commutator 68 with which engage brushes 69. Desired connections may be made between the brushes 69, the field brushes 15 and 16 and the controller, not shown. These connections will vary according to the particular winding of the armature and field structure. For the present invention it is only necessary to presume such connections as will enable the armature circuit to be opened or closed on the field when desired through a gradually cut out resistance, and as will enable the armature leads to be reversed if desired.

Keyed on the shaft 40 is a pinion 70 which meshes with one or more pinions 71 carried by the rotatable quill 30. For clearness only one such pinion is shown. It is mounted on a stud 72 carried by the end portion 35 and transverse internal brace 36 of the quill. Keyed to the hubs of the pinions 70 are pinions 75 which mesh with teeth 57 on the sleeve 50. This construction establishes an epicyclic train between the drive shaft 40 and the driven sleeve 50, such train being connected also to the quill 30.

Rigid on the sleeve 52 is a chain wheel 80 which meshes with a chain 119 and pinion 81, journaled on a stud 82 mounted in the stationary housing 26. Keyed on the hub of the pinion 81 is a chain wheel 84 which meshes with a chain 120 and pinion 85 keyed to the sleeve 64, which extends from and is rigid with the armature core. This reduction gearing connects the sleeves 50 and 52 with the armature, so that they rotate in the same direction.

The positive mechanical connections described cause the field structure and the shaft 40 to rotate in the same direction as the engine shaft and at the same speed. The gearing described (assuming that the vehicle is stationary) causes the sleeves 50 and 52 to rotate in this same direction but at a greater speed than that of the engine shaft, while the armature also rotates in the same direction but at a speed less than that of the sleeves but greater than that of the engine shaft. The planetary gearing, for example, may cause the sleeves 50 and 52 to rotate at twice the speed of the engine shaft, while the reduction gearing may cause the armature to rotate at about two-thirds the speed of the sleeves, which would be about one-third higher than that of the engine shaft.

As the armature speed is higher than the engine shaft there is a relative difference of speed between the armature and field and the consequent slip tends to generate a current. If the generator be short-circuited this slippage would tend to reduce itself, and, in doing so, would carry around the quill 33 by reason of the epicyclic gearing described, and thus transmits movement to the vehicle. This will be explained at length hereinafter. For the present it should be noted that as the slip diminishes the torque decreases and the car speeds up until the point is reached where the minimum slip is attained. The car is now well under way and ready for direct clutch connection between the driving and propeller shafts, as will now be explained.

To effect a direct clutching action between the driven shaft 40 and the propeller shaft 30 independently of the electric action, I provide a multiple disk clutch shown in Figs. 1, 6 and 7. This clutch consists of a series of plates 90 carried by the interior of a portion 34 of the quill, and another series of plates 91 arranged alternately with the plates 90 and carried by a rotary support or clutch member 92 keyed to the sleeves 50 and 52. Accordingly, the engagement of this clutch will lock these sleeves directly to the quill, and as the quill is connected by different sized gears with the sleeve 50 and the shaft 40, all these parts are locked together, so that the quill and propeller shaft must rotate as a unit with the drive shaft 40 and the engine shaft.

The clutch is shown in Fig. 1 as disengaged. It is held in this disengaged position by an operating lever 100 which may be connected for convenient operation from the driver's seat. This lever is shown in the position for disengaging the clutch in full lines in Fig. 1, the engaging position being shown in broken lines. The lever is pivoted at 101 and has connected with it at 102 a bail 103, which extends across the end of a plunger 104. This plunger bears against an ear 105 on a ring-shaped lever 106 pivoted at 108 to the stationary frame 28. Journaled in this lever are trunnions 111 extending from diametrically opposite sides of a ring 112. This ring has a flanged end 113 which bears against a flange on an abutment ring 114. This ring extends opposite the overlapped portions of the two sets of disks. It is given a tendency to move toward them by compression springs 117. These springs are mounted in pockets in a rotary member 118 and press against a flange 116 on the abutment ring 114. The rotary member 118 is rotatably mounted on the hub of the clutch member 92 and its pockets, when the clutch is disengaged, abut against the stationary housing 26.

When the clutch is allowed to engage by moving the lever 100 from the position shown in full lines to the position shown in dotted lines, Fig. 1, the springs press the abutment member 114 against the disks to clamp them, and then the quill, the disks carried by it, the member 92, its disks, the abutment ring and the member 118 all rotate as a unit.

The clutch member 92, together with the member 118, is slidable slightly longitudinally on the sleeve 52. When the clutch is disengaged the springs, bearing against the stationary abutment flange 116, press the member 118 against the stationary housing 26, but when the clutch is engaged the thrust from one end of the springs is taken through the member 114 and the disks to the member 92, and from the other end through the member 118 to the flange on the hub of the member 92. There is accordingly no spring pressure tending to hold the member 118 against the stationary housing, and, therefore, these parts are free from each other, enabling the clutch members to revolve without material friction.

It may be noted that the type of clutch above described (which provides for taking the thrust of both ends of the springs between rotating members when the clutch is engaged, and between stationary members when the clutch is disengaged) is shown and claimed in my prior Patent No. 1,281,741, issued October 15, 1918.

The operation of my device has been briefly explained as consisting of closing the armature on the field through a suitable resistance, gradually cutting out this resistance until the generator is short-circuited and the car has speeded up, and then allowing the clutch to engage. The gradual short-circuiting of the generator reduces the slip between the armature and field, resulting when the car is standing, and converts such difference of movement to a bodily travel of the planets of the planetary gearing, thus propelling the car. As the current generated in the armature is in direct proportion to the slip, the maximum torque will be obtained as the rotation of the quill starts, this torque reducing as the speed of propulsion increases.

The electric action of the mechanism can be best understood from an example with specific proportions of parts and rates of rotation, these being assumed simply as illustrative. Let us assume that the engine when running with the clutch engaged or what we may call "on high gear" delivers its maximum torque of fifteen miles per hour. The torque times the speed being a constant, theoretically we would obtain by the electric transformation a torque of 1.5 times the maximum engine torque at a speed of ten miles per hour and a torque of 4 times the maximum engine torque at three and three-fourths miles per hour. However, the electrical and mechanical losses reduce these amounts, so that nine miles per hour for a torque of 1.5 and three miles per hour for a torque of 4 times the engine torque is about what may be expected. The engine is assumed to have a speed of 600 revolutions per minute which will give its maximum torque.

In the particular proportioning of parts shown in Fig. 1, the gear ratio from the gear 70 to the pinion 71, is 6 to 5, while the ratio from the pinion 75 to the pinion 57 is 5 to 3, thus making a multiplication from the pinion 70 to the pinion 57 of 2 to 1. The reduction by the gearing 81 and 84 is 1 to .7. Accordingly, if the engine rotates at 600 revolutions per minute, the field and driving shaft 40 must both rotate at 600 R. P. M., while (if the car is stationary) the sleeves 50 and 52 will rotate at twice this speed, or 1200 R. P. M., and the armature will rotate at .7 of this 1200, or 840 R. P. M. Accordingly, though the field and armature rotate in the same direction, there will be a difference of rotation between them, or "slip," of 240 R. P. M.

Reverting to the point where we close the armature upon its field, suppose we require to give the propeller shaft 4 times the maximum engine torque, which will mean the car is going at 3 miles per hour. The speed of the engine being 600 and the speed of the quill being one-fourth of this or 150, leaves 450 R. P. M. to be transmitted to the electrical apparatus. These 450 revolutions transferred to the electrical apparatus will enable it to add a torque of 3 times that of the engine, making a total torque of 1 plus 3 or 4. The speed of the sleeves 50 and 52 will be twice 450 plus 150 or 1050 R. P. M.; the speed of the armature will be .7 times 1050 or 735 R. P. M. The speed of the field still remaining at 600, there is therefore a slip of 135 R. P. M. The dynamo is designed to transmit its torque (which in this example is three times the engine torque) one-half in reaction through the gear to the quill and the other half in helping the engine. In other words, the reaction of the armature drags the field with it which in turn acts on the engine shaft as a motor. It will therefore be seen that with a dynamo action equivalent to three times the engine torque applied to the shaft plus the engine torque itself of 1 we obtain 4 times the engine torque on the quill at 3 miles per hour or one-fifth of the speed (15 M. P. H.) of maximum torque of the engine itself.

As the load on the driven shaft eases, the generator action will decrease the slip and thus automatically speed up the car. When the minimum slip is obtained a still higher speed is reached by clutching the quill direct to the engine shaft.

As the gear reduction shown is .7, the electric transmission only takes the car up to a little less than seventy per cent. of full speed, and the slipping of the clutch is relied upon to gradually take up the remaining thirty per cent. and bring the car to speed. This arrangement has two advantages: first, it gives less slip on low gear, which is desirable as the slip is the measure of loss, and, second, it has the effect of enabling the dynamo to be used as a battery charger (for lighting, ignition, etc.) at high speed.

In explanation of the battery-charging action it will be remembered that when the clutch is applied the sleeves 50 and 52 will rotate at the same speed as the engine shaft, whereby the speed of the armature through the gearing will be at the ratio of 1 to .7 or thirty per cent. less than the speed of the engine shaft or the field. A thirty per cent. slip in the other direction is accordingly obtained and this slip is used for generating current for charging the battery.

The dynamo can also be used for starting the engine. In doing this it is necessary to start the armature in the same direction as the rotation of the engine. The reaction of the field will tend to drive the engine in the opposite direction, but the armature being geared directly to the engine shaft will tend to drive it in the same direction. As the gearing from the armature to the engine shaft is as 1.4 to 1, the balance of the torque, which will drive the engine in the right direction, will be .4 of the electric reaction between the armature and field.

In Fig. 9 I have illustrated diagrammatically a controller for effecting the circuit changes desired to enable the mechanism to act merely as a transmission, or for charging, or as a self-starter. Referring to this diagram, I indicate at 151 to 159 inclusive a row of contact fingers constituting terminals from the armature field and shunt and from the battery, while above these are indicated various contact plates on a suitable controller drum, not shown. The plates designated 161 to 166 inclusive, coöperate with the contact fingers 151 to 156 for transmission. Plates 171, 172, 175, 176, 177, 178 and 179 coöperate with the corresponding contact fingers of the 150 series, for charging the battery; similarly contact plates 181, 182, 185, 186, 188, 189 coöperate with the corresponding fingers for starting.

Fig. 12 is a diagram illustrating the circuit for transmission. showing the generator short circuited on itself, A indicating the armature and F the field. This is gradually effected through suitable resistance stages until finally the resistance is cut out. As an illustration of this connection we may take the first position, in Fig. 9, where the current passes from the armature to the slip ring 192, through the total resistance to contact finger 154, to contact plates 164, to plate 165, to finger 155, slip ring 195, through the field F, to slip ring 196, finger 156, plate 166, plate 161, finger 151, slip ring 191, to the armature.

The charging connections are illustrated in Fig. 9 and Fig. 11. As shown in the latter figure, current passes in series from the armature A, through the battery B and the series field F, to the armature, while a shunt passes from the armature through shunt S, in the opposite direction to the current through the series field and back to the armature. Tracing these circuits on Fig. 9, the main path passes from the armature to slip ring 192, contact finger 152, plate 172, plate 179, finger 159, battery, finger 158, plate 178, plate 176, finger 156, slip ring 196, field F, slip ring 195, finger 155, plate 175, plate 171, slip ring 191, armature; while the shunt path passes from the armature to slip ring 192, to finger 152, to plate 172, plate 177, finger 157, slip ring 197, through the shunt in the direction opposite to the field to slip ring 195, and thence back to the armature.

The charging is effected when the clutch is thrown in and the armature rotates faster than the field. The generation is done by the shunt magnet, while the series magnet demagnetizes, and, therefore, demagnetizes the field as the current increases. This will prevent the current rising appreciably when the generator is speeded up.

A starting is effected by reversing the armature leads and connecting in the battery. The armature then revolves in the same direction as the engine and drags the field with it. This is the circuit illustrated in Fig. 10. We may trace this circuit in Fig. 9 as follows:—armature, slip ring 192, finger 152, plate 182, plate 185, finger 155, slip ring 195, field F, slip ring 196, finger 156, plate 186, plate 188, finger 158, battery, finger 159, plate 189, plate 181, finger 151, slip ring 191, armature.

Having thus described my invention, what I claim is:

1. The combination, with a prime mover, of a member to be propelled, a rotary field structure and a concentric rotary armature, one of which is connected with the prime mover, and gearing connecting both the prime mover and the other rotary member with the member to be propelled, there being also change-speed gearing included in the connection between one of said rotary members and the device which rotates it, said gearing being journaled on an axis non-concentric of the dynamo axis.

2. The combination, with a prime mover, of a member to be propelled, a rotary field structure and a coacting rotary armature, epicyclic gearing connecting the prime mover with the member to be propelled, connections between one of said rotary members and the prime mover and between the other rotary member and the epicyclic gearing, one of such connections including spur gearing having a fixed bearing and adapted to change the speed transmitted without reversing its direction.

3. The combination of a driving shaft, a member to be propelled, a sleeve about the driving shaft, reaction gearing between the sleeve and both the shaft and the member to be propelled, and a field structure and armature, one of which is connected with the prime mover and the other of which is connected by means of reaction gearing with said sleeve, one of said connections including change-speed gearing having a fixed bearing.

4. The combination of a driving shaft, a sleeve surrounding the same, a propeller member, epicyclic gearing connecting the shaft with both the propeller member and the sleeve, and a rotary armature and a rotary field structure, one of which is connected with said sleeve and the other of which is connected with said shaft, and change-speed gearing in one of such connections.

5. The combination of a driving shaft, a rotary field structure connected therewith, an extension of the driving shaft, a sleeve surrounding the same, a propeller shaft, planetary gearing connecting the extension shaft with both the propeller shaft and the sleeve, and a rotary armature connected with said sleeve, and change speed gearing in the mechanical connection to the dynamo consisting of said field structure and armature.

6. The combination of a driving shaft, an alined extension shaft and an alined propeller shaft, a sleeve around the extension shaft, planetary gearing connecting said sleeve with both the extension shaft and the propeller shaft, an armature surrounding said sleeve, change speed gearing connecting it with the sleeve, and a rotary field structure surrounding the armature and directly connected with the driving shaft.

7. The combination of an internal combustion engine having a shaft, of a rotary field structure mechanically connected therewith, an extension of said shaft, a propeller shaft, a sleeve surrounding said extension shaft, planetary gearing between said sleeve and said extension shaft and said propeller shaft comprising suns on the sleeve and extension shaft respectively and planets carried by the propeller shaft, and an armature within the field structure mechanically connected with the sleeve, there being gearing mounted on a fixed bearing constituting a part of one of the mechanical connections to the dynamo consisting of said field structure and armature.

8. The combination of an engine having a shaft, an extension shaft alined therewith, a propeller shaft alined with the extension shaft, a sleeve surrounding the extension shaft, an armature surrounding the sleeve, and mechanically connected with it, planetary gearing connecting the sleeve with both the extension shaft and the propeller shaft, and a rotary field structure surrounding the armature and mechanically connected with the engine shaft, there being change speed gearing in one of said mechanical connections.

9. The combination of a driving shaft, a sleeve surrounding the driving shaft, a member to be propelled, epicyclic gearing between said sleeve, said driven shaft and said member to be propelled, a friction clutch adapted to connect the shaft with the member to be propelled, and a rotary field structure and armature, one connected with the driving shaft and the other connected with said sleeve, one of said connections having change-speed gearing mounted on a fixed bearing.

10. The combination of a driving shaft, a sleeve surrounding the driving shaft, a member to be propelled, planetary gearing between said sleeve, said driving shaft and said member to be propelled, a friction clutch surrounding the driving shaft and adapted to connect it through the planetary gearing with the member to be propelled, and a rotary field structure and armature, one connected with the engine shaft and the other connected with said sleeve, one of such connections including gearing having an outside axis.

11. The combination of an engine shaft, a rotary field structure positively connected therewith, an extension of the engine shaft, a member to be propelled, a sleeve surrounding the extension shaft, an armature surrounding said sleeve, spur gearing between the armature and said sleeve, planetary gearing connecting the sleeve, the extension shaft and the member to be propelled, a friction clutch located between said spur gearing and said planetary gearing and surrounding the extension shaft and adapted to connect it through the planetary gearing with the member to be propelled, and external means for operating said clutch.

12. The combination of a driving shaft, a sleeve surrounding the same, a member to be propelled, reaction gearing between said sleeve, said shaft and said member, a friction clutch adapted to couple said sleeve to said member to be propelled, a rotary armature and field structure, one of which is connected with the driving shaft and the other of which surrounds and is connected with said sleeve, and gearing rotating about an outside axis and forming part of one of such connections.

13. The combination of an engine shaft, an alined extension shaft, an alined propeller shaft, a sleeve about the extension shaft, planetary gearing connecting the sleeve and extension shaft with the propeller shaft, a clutch adapted to connect the extension shaft through the planetary gearing with the propeller shaft, an armature about the sleeve, a shaft parallel with the extension shaft, gearing on said parallel shaft connected with both the armature and the sleeve, and a rotary field structure surrounding the armature and directly connected with the engine shaft.

14. In an electro-magnetic transmission, the combination of a prime mover having a shaft, a member to be propelled carrying a quill, a rotary field structure and a rotary armature, one connected with the engine shaft and the other revoluble concentrically with it, planetary gearing carried by the quill connecting said revoluble member with both the quill and the prime mover, and a friction clutch, one member of which is connected with the quill and another member of which is geared with one of the planets.

15. The combination of a driving shaft having an extension, a propeller shaft, a sleeve about the extension, planetary gearing between the sleeve, the extension and the propeller shaft, said planetary gearing being carried by a quill extending from the propeller shaft, a friction clutch, one member of which is carried by the quill and another member of which is carried by the sleeve, and a rotary field structure and rotary armature, one of which is connected with the driving shaft and the other of which is connected with the sleeve.

16. The combination of a drive shaft, a propeller shaft, a sleeve about the drive shaft, planetary gearing between the sleeve, the drive shaft and the propeller shaft, said planetary gearing being carried by a quill extending from the propeller shaft, a friction clutch, one member of which is carried by the quill and another member of which is carried by the sleeve, a rotary field structure and a rotary armature, one of said rotary members being connected with the drive shaft and the other with the sleeve, and gearing having an outside axis and forming a part of one of such connections.

17. The combination of an engine having a shaft, an extension shaft connected therewith, a propeller shaft, a sleeve surrounding the extension shaft, planetary gearing connecting said sleeve with the extension shaft and with the propeller shaft, said planetary gearing having planets mounted on studs carried by a quill connected with the propeller shaft, a friction clutch having multiple disks, one set of which is connected with said quill and the other set of which is connected with said sleeve, outside means for controlling said clutch, and a rotary field structure and a rotary armature, one of which is mechanically connected with the engine shaft and the other of which is mechanically connected with said sleeve.

18. The combination of an engine shaft, a rotary field structure connected therewith, an alined extension for the engine shaft, a propeller shaft having a quill surrounding the extension shaft, a sleeve surrounding the extension shaft, planetary gearing carried by the quill connecting the sleeve with the extension shaft, a friction clutch having two members, one of which is connected with the quill and the other of which is connected with said sleeve, an armature surrounding the sleeve, gearing mounted on an axis outside said extension shaft and connecting the armature with said sleeve.

19. The combination with a driving shaft, a sleeve surrounding the shaft, a rotary quill extending over the shaft and sleeve, planetary gearing carried by the quill connecting the sleeve with the shaft, a multiple disk friction clutch carried partly by the quill and partly by the sleeve and adapted through the planetary gearing to connect the shaft directly with the quill, a spring for seating said clutch, lever mechanism operated from the outside for releasing the clutch, a second sleeve surrounding the sleeve mentioned, spur gearing connecting said two sleeves, and a rotary armature and a rotary field structure, one mounted on said second sleeve and the other connected with the driving shaft.

20. The combination of a dynamo having both members rotary, an engine connected with one member, gearing connected with the other member, a member to be driven, and epicyclic gearing connecting the same with the gearing first mentioned and with the engine, said epicyclic gearing having its planets carried by the member to be driven and one of its suns directly connected with the engine and the other sun with the gearing first mentioned.

21. The combination of a dynamo having both field structure and armature rotary, an engine, a member to be driven, epicyclic gearing connected to the last mentioned member and to the engine, said rotary members being connected one with the engine and the other with the epicyclic gearing, and change-speed gearing mounted on a fixed axis and constituting part of the connection last mentioned.

22. The combination of a dynamo having both members rotary, a prime mover connected with one of said members, a member to be propelled, reaction gearing having planets carried by the member to be propelled, and a pair of suns connected respectively with the two members of the dynamo, one of the connections between a sun and the dynamo member with which it is connected including gearing mounted on a fixed bearing.

In testimony whereof, I hereunto affix my signature.

THORSTEN von ZWEIGBERGK.